April 18, 1939.   J. A. J. BENNETT   2,154,601
AIRCRAFT, AND SUSTAINING ROTORS THEREFOR
Filed May 14, 1935   4 Sheets-Sheet 3
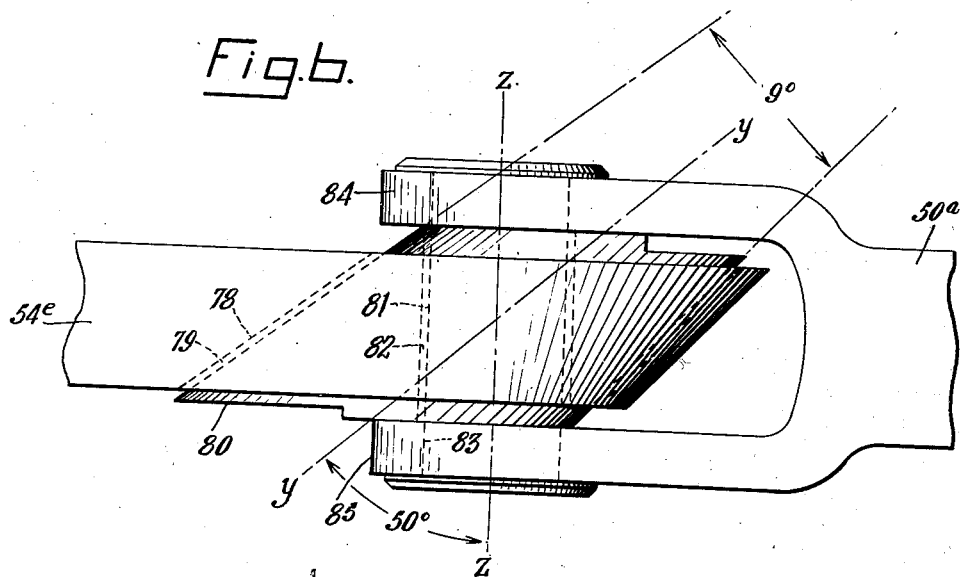
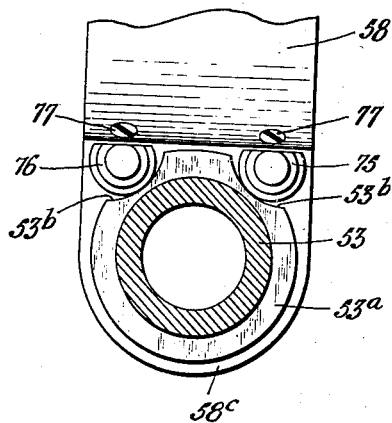
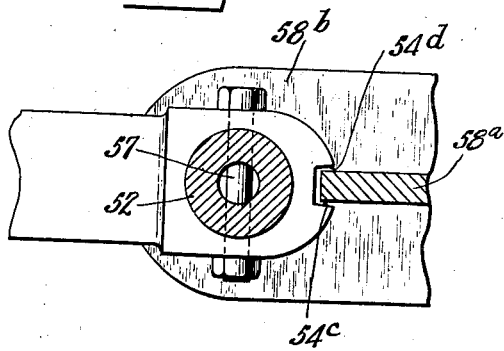
INVENTOR
James Allan Jamieson Bennett
BY
ATTORNEYS

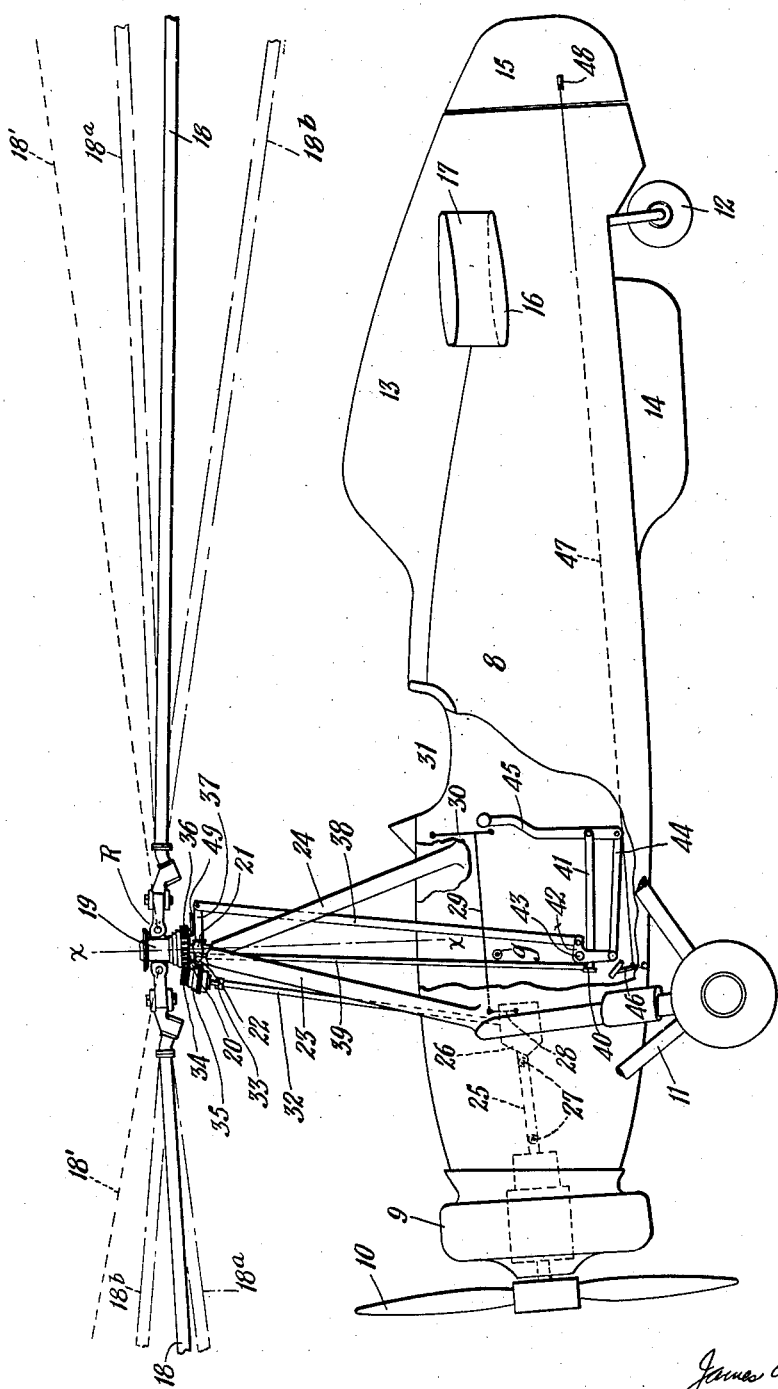

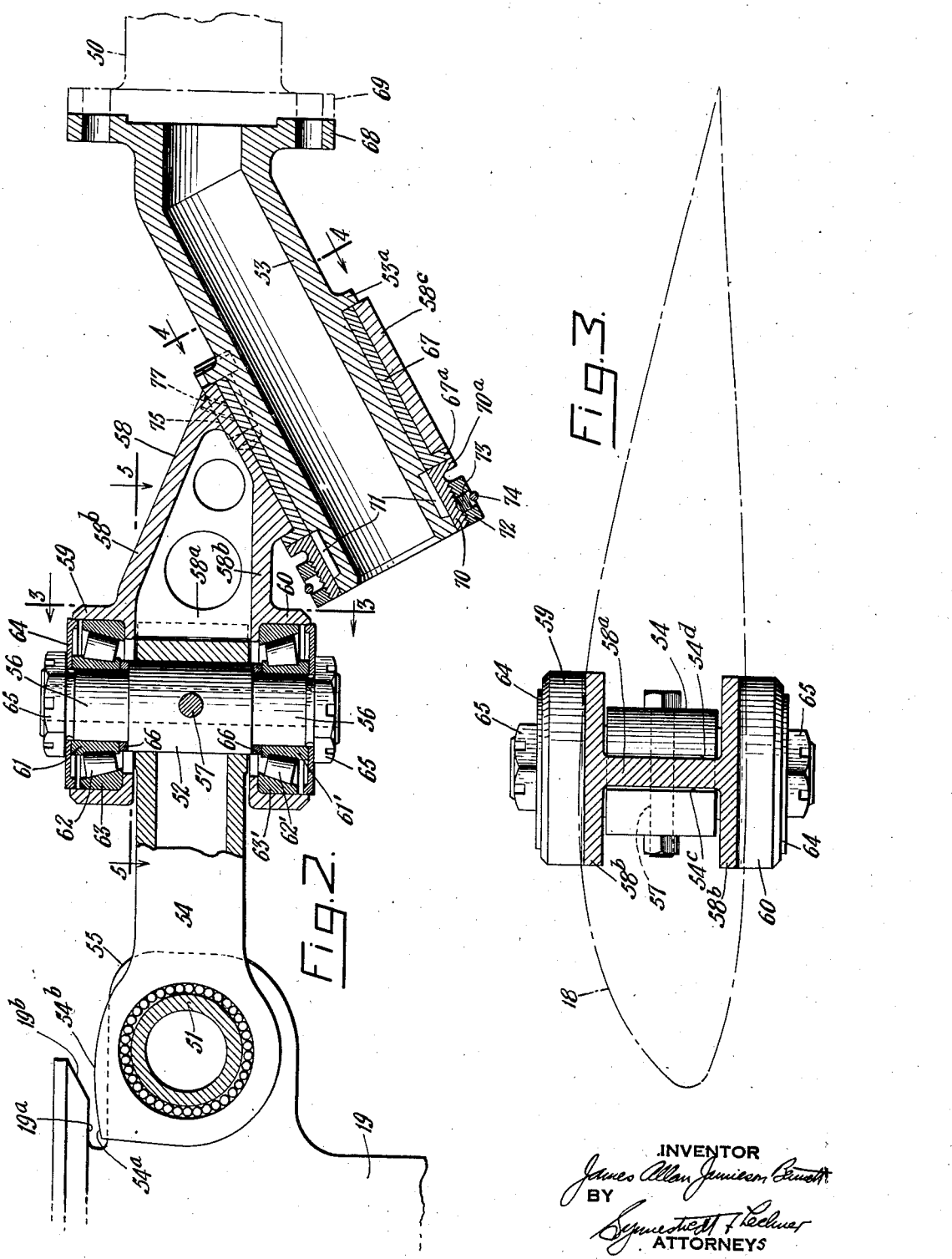

UNITED STATES PATENT OFFICE 2,154,601

AIRCRAFT, AND SUSTAINING ROTORS THEREFOR

James Allan Jamieson Bennett, Genista, Newton Mearns, Scotland, assignor, by mesne assignments, to Autogiro Company of America, a corporation of Delaware Application May 14, 1935, Serial No. 21,454
In Great Britain May 16, 1934

37 Claims. (Cl. 244—18)

The present invention relates to aircraft, and sustaining rotors therefor, and particularly to aircraft in which the principal means of support in flight consists of a system of rotative wings or blades, hereinafter referred to as a rotor, mounted for free rotation about a substantially vertical axis and adapted for autorotation in flight under the influence of the flight wind, and in which means of forward propulsion are provided consisting of an engine driving an airscrew or the like propulsive device, together with means for imparting an initial rotation to the rotor, hereinafter referred to as a rotor starter, which may comprise a disconnectable driving connection between the said engine and the rotor adapted to apply a torque to said rotor. While the invention is not limited to a particular type of rotative winged aircraft, it is especially useful in a machine of the above-described general type, in which there is further provided some means for controlling the craft by means of the rotor, as, for example, by tilting the rotor in all directions to shift the lift line thereof; since such operation of the rotor gives adequate control under substantially all flying conditions, including both vertical descent and vertical take-off.

More particularly, the present invention refers to means for varying the pitch angles of the individual rotor blades, which means are responsive to the torque applied to the rotor through its hub or axis member in such a manner that the application of a driving torque, i. e., one tending to rotate the rotor in the normal direction of rotation causes a diminution of the blade pitch angle. The pitch varying means above referred to operate in such a manner that when a driving torque is applied to the rotor for starting purposes the pitch angle of the blades is substantially reduced, preferably to the value corresponding with zero lift or minimum rotational drag on the rotor and that on the vanishing of the impressed torque the blade pitch angles are automatically increased, being eventually restored to the normal value for flight, and for this purpose use is made of the centrifugal force experienced by the blade, the centrifugal force being applied to bring about the increase of blade pitch angle.

Various advantages are conferred by the present invention. For example, a more effective action of the rotor starter is obtainable than is possible with prior arrangements; and allied with this the invention further contemplates improvement in the "take-off" and particularly a substantially vertical take-off of the aircraft. By reducing the pitch angle of the rotor blades substantially to that of zero lift during the application of the starting torque, the aerodynamic resistance of the blades is reduced to its minimum value whereby a largely increased speed of initial rotation can be imparted to the rotor without increased expenditure of power, and on disappearance of the starting torque, as by disengaging a starter clutch, the pitch angle of the rotor blades immediately increases and the excess energy stored in the rotor by reason of its extra speed is immediately available for conversion into lift whereby to raise the aircraft off the ground.

Hitherto, in aircraft of the autorotative-wing type, the rotor blades have been attached to the hub member by means of a "double-articulation" comprising a primary or "flapping" articulation with its axis substantially at right angles to the rotor axis and to the longitudinal axis of the blade and a secondary or "drag" articulation with its axis substantially at right angles to the primary articulation axis, the longitudinal axis of the blade being arranged substantially at right angles to the axes of both the "flapping" and "drag" articulations.

This construction is utilized in the preferred embodiment of the present invention according to which, however, a third articulation is introduced, its axis being substantially at right angles to the primary articulation but inclined with respect to the longitudinal blade axis and with relation to the secondary articulation.

The axis of the third articulation is inclined outwardly and upwardly with reference to the axis of the drag articulation, so that the blade in swinging about the "inclined" articulation describes a cone with vertex downwards. The result of this is that as the blade is displaced backwards on the inclined articulation, i. e., against the direction of rotation of the rotor, the pitch angle of the blade is decreased.

The arrangement of the triply articulated blade attachment is further such that while movement of the blade on the inclined articulation occurs when a torque, either driving or braking, is applied to the rotor and during recovery of the normal flying position after the torque has ceased to be applied, the movement on the inclined articulation in normal flight is nil, or at least small relatively to the possible movement.

Preferably this is achieved by providing a greater frictional resistance to movement about the inclined articulation than about the drag articulation at least when the rotational speed of the rotor exceeds a certain value and by the use of suitable stops limiting the possible movement on the drag articulation to about the amplitude of oscillation of the individual blades in normal flight maneuvers, which is of the order of 1.5° on either side of the mean position. The drag articulation stops do not prevent movement about the inclined articulation, other stops being provided for this purpose, these latter stops serving respectively to transmit the driving torque of the starter and the braking torque of the rotor brake for slowing down the rotor on landing, if the aircraft is provided with such a rotor brake.

The operation of the inclined articulation will now be described.

When torque is applied to the rotor hub from the engine for starting, the inertia and drag of the blade cause it to rotate around the drag articulation. The angular displacement around the drag articulation being limited by stops, rotation of the blade about the drag articulation ceases when the blade has moved through a small angle as defined by the drag articulation stops. Thereafter the blade moves around the inclined-articulation and describes a conical surface, the blade pitch angle being thereby reduced. When the required reduction in blade pitch angle has been effected the blade reaches a stop and is held in this position by the moments attributable to the drag, the inertia of the blade and the hinge friction.

The blades are accelerated in this position to a rotational speed much greater than in normal flight. This is made possible by the decreased blade drag consequent on the reduction of blade pitch angle which is preferably zero (i. e., the lift coefficient $k_L$ is zero) when the blade is on the rear stop of the inclined articulation. When the required R. P. M. have been reached the rotor is declutched from the engine, the blades now rotating at zero torque. The centrifugal force on the blades causes the hub to swing around relatively to the blades, the moment R of the centrifugal force being greater than the inclined hinge friction moment F. The blade pitch angle is therefore suddenly increased to its normal value whilst the R. P. M. of the rotor are still higher than in normal flight. Consequently the aircraft rises vertically or quickly from the ground.

During the interval of time from the instant the blades are declutched until the rotor R. P. M. have decreased to their value for normal flight, the propulsive airscrew can be used to accelerate the aircraft to the required forward speed to give maximum rate of climb.

The drag moment and the inertia moment being respectively designated by D and I, the following relations obtain between the various moments during the above described operation:

(a) When positive torque is being applied and while the blade is rotating backwards on the inclined articulation and the blade pitch angle is decreasing, $(D+I)>F$ (b) When the blade is against the rear stop of the inclined articulation, $(D+I+F)>R$ (c) After declutching, when the blade leaves the inclined articulation stop, $R>F$ Besides enabling a quick "take-off" to be made, the inclined articulation, as embodied in the present case, presents other advantages as follows:

Firstly, it may serve as a friction damper whenever the amplitude of oscillation of the blades about the drag articulation becomes excessive. The blade then rotates about its drag articulation until it reaches the drag articulation stop. Thereafter the blade rotates about the inclined articulation, the greater friction of which effectively damps the oscillation.

Secondly, it may be used to decrease the speed of vertical descent. By applying a braking force to the hub the blades swing around the inclined articulation, the blade angle thereby increasing until the forward stop is reached. The aircraft is then subjected to a greater lift, at the expense of rotor R. P. M. This maneuver is useful for the purpose of decreasing the vertical speed of descent when landing, and since it sets up a torque reaction upon the body of the craft, a counteractant should be employed, such as a rudder located within the propeller slipstream.

The satisfaction in all cases of relations (a), (b) and (c) may be secured by suitably choosing the values of the frictional moment F and the centrifugal moment R, the drag and inertia moments being already determined by the basic design of the rotor. The frictional moment is susceptible of variation in a number of ways, e. g., by the use of adjustable friction dampers or merely by suitable choice of the kind and fit of the bearing used, or by combinations thereof, while three methods are available for varying the centrifugal moment, viz:

(I) Varying the position of the drag articulation stops, (II) Varying the position of the inclined articulation stops, (III) Varying the offsets of one or both of the inclined and drag articulations from the rotor axis, as the centrifugal moment when the blade is experiencing the driving torque depends on its angular displacements from the normal position about the inclined articulation (backwards) and about the drag articulation and also on the distances separating the inclined and drag articulations from the rotor axis. The frictional moment F of the inclined articulation being greater than that (hereinafter denoted by $f$) of the drag articulations, it follows that as the centrifugal moment R increases during the acceleration of the rotor, the blade will leave the backward stop of the drag articulation and swing onto the forward drag stop if and when R exceeds $(D+I+f)$ which value is less than $(D+I+F)$ so that the blade will still remain on the back stop of the inclined articulation. In this position R depends on the backward displacement of the blade about the inclined articulation and the forward displacement about the drag articulation. Thus, the determination of R to satisfy relations (b) and (c) is affected not only by the position of the back stop of the inclined articulation but also by that of the forward stop of the drag articulation, and by a suitable choice of the angular position of the inclined articulation back stop and of the angular freedom of the blade between the forward and back stops of the drag articulation the desired results is obtained of keeping the blade on the inclined articulation back stop, so that minimum pitch angle is maintained, during the acceleration of the rotor (relation (b) and also of causing the blade to leave the inclined articulation back stop (relation (c)), on discontinuing the driving torque. As other considerations, such as the oscillation of the blade in its plane of rotation in normal flight maneuvers, enter into the choice of angular freedom about the drag articulation and the choice of position of the back stop of the inclined articulation may be limited by structural and other considerations, these choices may be supplemented by a suitable choice of articulation offsets, as referred to above under (III).

To ensure a correct value at all times of the frictional moment about the inclined articulation, the lubricant used therein is preferably one whose frictional properties are substantially unaffected by changes of temperature, lapse of time and the like circumstances.

As the blade swings forward about the inclined articulation when the driving torque has ceased, the centrifugal moment R decreases until a position is reached in which the friction moment F equals the centrifugal moment R and it is advantageous so to choose the frictional moment that this occurs when the blade pitch angle is substantially less than that required for normal flight, as the efficiency of the rotor at low forward translational speeds is greater when the blade pitch angle is relatively small. As the aircraft increases its forward speed, the "flapping" on the primary articulation (which is relatively freer of friction, or other resistance, than either of the other articulations) sets up oscillatory aerodynamic moments acting on the blade in the plane of rotation which are augmented by the centrifugal moment to a greater extent in the forward direction than in the backward direction, in which latter direction the aerodynamic and centrifugal moments may even be in opposition, with the result that the blade while oscillating about the drag articulation is swung forwards about the inclined articulation until the centrifugal moment about the latter disappears altogether in which position the blade pitch angle is the normal one for flight, and thereafter the inclined articulation is substantially locked by friction.

Although the stops of the drag articulation are spaced widely enough to allow the normal oscillation in the plane of rotation in flight to take place about the drag articulation, any excessive oscillation will involve the inclined articulation (which because of its angularity permits of some blade movement in the directions of drag and acceleration as well as in the directions of pitch variation) and this, on account of its superior friction, serves to damp such excessive oscillations effectively. It is preferable to endow the drag articulation with a certain amount of friction independent of rotational speed provided this friction in the drag articulation is substantially equal to or less than that part of the friction in the inclined articulation which is independent of rotational speed. This is especially required when the aircraft is on the ground and the rotor is being accelerated or decelerated, during which operations the rotor speed must in general pass through a value which is in resonance with the natural transverse frequency of the undercarriage.

In further explanation, it may be pointed out that the frictional resistance in both articulations will in general increase with rotational speed on account of increased bearing loading resulting from centrifugal force and more particularly in the inclined articulation of the type hereinafter described having a bearing which is self-tightening under end loading.

It is preferable to provide the inclined articulations with forward stops set to limit the maximum increase of blade pitch angle to that required for normal (high-speed) flight.

Constructionally the inclined articulation may be separate from the drag articulation, the root attachment of the blade including two articulation links; or the drag and inclined articulation may be combined in various ways, as by arranging them on intersecting centers and using a single member as one of the essential elements of both articulations.

The friction of the inclined articulation may be introduced in a variety of ways, for example, either by using a bearing having in itself enough friction or by the use of additional friction dampers which may be adjustable, or by combinations of various devices.

According to a further feature of the invention, use is made of the centrifugal force to increase the bearing friction of the inclined articulation as by employing a conical or other tapered bearing arranged to carry the end thrust caused by the component of centrifugal force acting along the axis of the bearing, so that the bearing is thereby tightened and its overall frictional coefficient increased.

How the foregoing objects, advantages, and principles of operation, are put into effect by the present invention will be evident in the following description, taken in conjunction with the accompanying drawings, in which drawings:

Figure 1 is a side elevational view of an aircraft, having rotative blades or wings, embodying one form of the present invention, a portion of the craft being broken away for illustration of some of the flying controls;

Figure 2 is a vertical section on a larger scale, through a blade root articulation, along the axis of one of the rotor blades of the machine shown in Figure 1 (with certain parts shown in elevation) illustrating the several separate pivots by which the blade is mounted on the hub, and showing bearing arrangements for obtaining different frictional resistance at the several pivots;

Figure 3 is a section taken on the line 3—3 of Figure 2;

Figure 4 is a section taken on the line 4—4 of Figure 2, showing the limiting stop devices for blade pitch variation;

Figure 5 is a section taken on the line 5—5 of Figure 2, illustrating the stop devices for controlling blade movement about the drag pivot;

Figure 7:
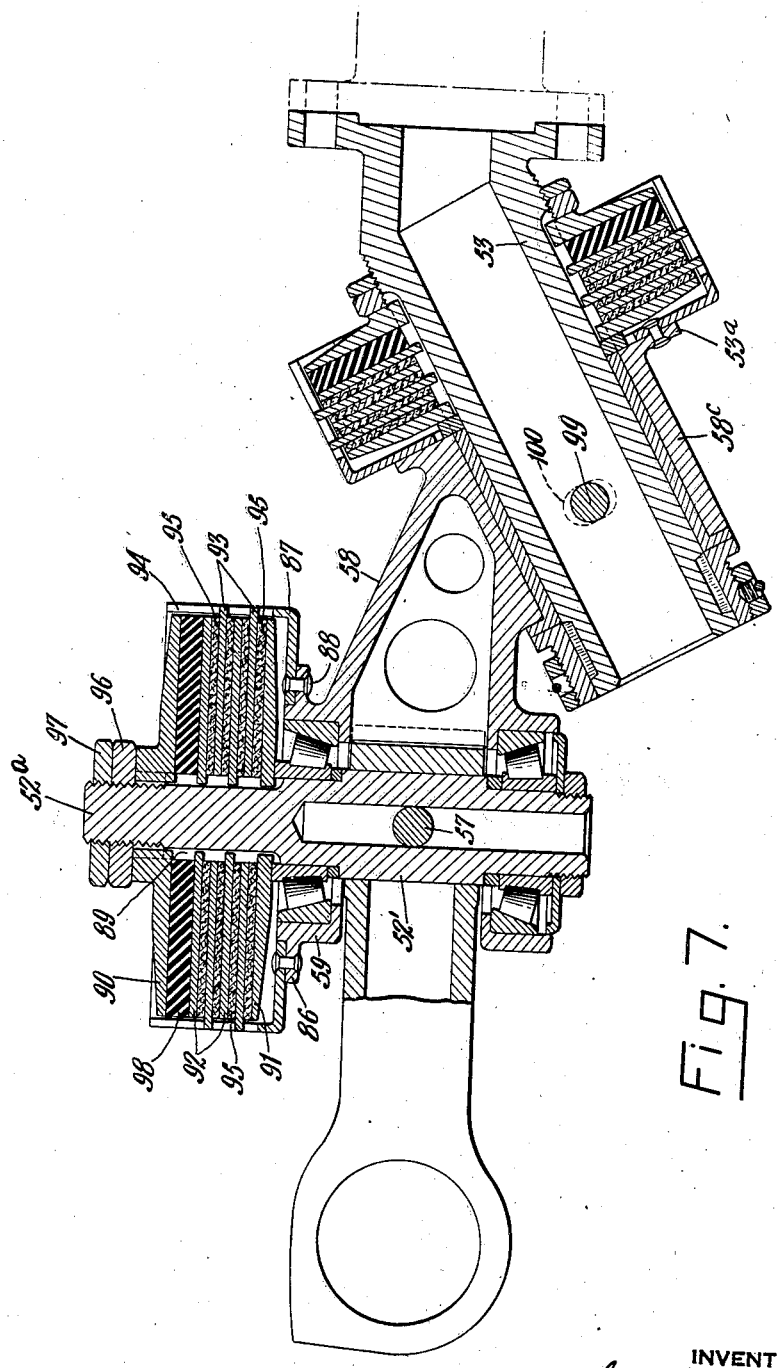

Figure 6 is a side elevational view of a modified form of articulation, in which the drag and inclined pivots are structurally combined and a tapered form of inclined pivot is employed as a means of varying the resistance to blade pivotation with variation in rotor speed, and Figure 7 is a view similar to Figure 2, illustrating a modified form of blade limiting stop on the inclined pivot as well as an adjustable friction device to vary the resistance to pivotation of the blade on one or more of the pivots.

By reference first to Figure 1 it will be seen that I have illustrated an aircraft 8 having an engine and propeller 9, 10, undercarriage 11, 12, vertical tail surfacing 13, 14, rudder 15, and horizontal tail surface 16, which latter may carry upturned fins or tip portions, one of which is indicated at 17.

The aircraft is sustained and preferably also controlled, in whole or large part, by means of a rotor, indicated generally by the letter R.

This rotor comprises elongated blades or wings 18 which are pivotally mounted, by mechanism illustrated in one or more of the other figures of the drawings, upon a central upright hub or axis member 19 which is normally freely rotatable about the upright non-rotating spindle or shaft 20, said shaft or non-rotative axis member 20 being tiltably carried by means of longitudinal and transverse fulcrums 21 and 22, respectively, upon a rigid fixed pylon formed of a plurality of struts or legs 23, 24, or the like. The initial rotation of the rotor prior to take-off may be imparted by the mechanism now to be described.

A shaft 25 extends rearwardly from the engine 9 to a gear-and-clutch box 26, and may embody a couple of universal joints, indicated at 27. The rotor starter clutch need not be illustrated herein, as it is now well known, but I have shown a clutch operating lever 28, connected by a link 29 to the operating handle 30 in the cockpit 31. Extending upward from the casing or housing 26 is a shaft 32 which has a combined universal and slip joint 33 near its upper end, and may have a similar universal joint (not shown) at or near its lower end. At its upper end this shaft 32 drives a pinion 34 through the medium of a shaft mounted in the bearing casing 35 which is secured rigidly to the fixed axis member 20. The pinion 34 is in constant mesh with a ring gear 36 fixed on the rotor hub 19. It will be seen that the universal and slip joint mechanism in the shaft 32 accommodates the tilting motions of the rotor hub when the same is moved in the manner immediately hereinafter described. Bearing casing 35 may also include a small overrunning clutch or other free wheeling device, so as to assure free rotation of the rotor in flight if for any reason the manual clutch operating lever 30 should be left in the engaged position.

For controlling the machine the axis x—x of the rotor is shifted, by tilting the hub. Longitudinal tilt (for longitudinal control of the craft) is effected, about the fulcrum 22, by means of the lever 37, which is actuated by the push and pull rod 38, extreme forward tilt of the rotor being indicated by the dot and dash position of the blades, shown at 18a, and extreme rearward tilt being indicated by the outline of the blades at 18b, although it will be understood that the blades in these positions as well as in the full line positions shown, are at their angle of rest. In actual flight the blades cone up somewhat to an average position diagrammatically indicated at 18'. Lateral tilt is obtained in a similar manner by rocking the hub about the fulcrum 21, by means of a lateral arm (not shown, but similar to the longitudinal arm 37) which is actuated by means of a push and pull rod 39. This lateral control rod 39 is connected by a lateral crank arm 40 to the torque tube 41, and the longitudinal control rod 38 is connected by a lateral crank arm 40 to the torque tube 41, and the longitudinal control rod 38 is connected by a bell crank 42, mounted on a fixed fulcrum 43, to a push and pull rod 44, the members 41 and 44 being connected in the usual manner to the control stick 45 in the cockpit. For additional explanation of such mechanism reference may be had to the copending applications of Juan de la Cierva, Serial No. 645,985, filed December 6, 1932 and Serial No. 738,349, filed August 3, 1934 and to their corresponding British patent specifications, the first of which bears issue No. 393,976, and the second, No. 420,322.

As is now known in this art, all normal maneuvers of the craft may be obtained by thus controlling the inclination of the rotor, in co-operation with the weathercock effect of the fixed tail surfaces. However, a rudder 15 actuated by means of rudder pedals 46, cables 47 and control horns 48, may be employed, particularly to counteract any turning effect in the body of the machine when making a descent and applying the rotor brake for the purpose of throwing the blades to their extreme positive pitch, as hereinbefore mentioned. The rotor brake may be of the internal expanding type, now known in this art, the operating lever of which is shown at 49.

Turning now to Figures 2 to 5 inclusive, it will be seen that the root end 50 of the blade spar (which usually runs throughout the length of the blade, along its longitudinal axis) is secured to or mounted upon the hub 19 by pivot mechanism, preferably comprising a series of three pivot pins or axes of articulation 51, 52 and 53; the blade 18, when in its normal mid position on all of these pivots, being at a good average autorotational incidence.

Pivot 51 secures the drag link 54 to one or more lugs or ears 55 which are integral with the hub 19. This pivot is the flapping pivot, which permits the blade to swing up and down to positions of equilibrium between the lift and centrifugal forces and relieves or eliminates bending and gyroscopic forces, and can also serve to eliminate a large proportion of the undesirable loads which would otherwise be imposed upon the rotor controls. To accomplish these results to the fullest extent it has been found desirable to place this pivot relatively close to the center of rotation of the hub, and furthermore to reduce its friction, especially the static friction, to a minimum. It will thus be seen that I have placed this pivot at the innermost position of the three articulative joints, and have fitted needle bearings between the pivot and the apertured root end of the drag link which receives the same. Downward droop of the rotor blade is arrested by contact of the abutment or surface 54a of the drag link with the surface 19a of the top flange of the hub. Excessive upward movement of the blade (as by wind gusts when the rotor is at rest on the ground) is prevented by contact of the drag link surface 54b with the surface 19b of the hub flange. The total range of angular movement permitted about the pivot 51 may be around 30° to 40°, most of which is in the upward or positive coning direction.

The outer end of the drag link 54 is vertically apertured to receive the secondary or drag pivot 52, which may be held in place by any suitable device such as the pin 57. As an intermediate member or link (which might be termed the "pitch link") between the drag pivot and the inclined pitch varying pivot, I have provided an arm or member 58, which may be in the form of an H section forging with web 58a and flanges 58b (see Fig. 3); the inner end of this member being forked to embrace the upper and lower faces of the drag link, and the jaws 59 and 60 of the fork being recessed to house the tapered roller bearings 61, 62, 63, and 61', 62', 63', located at the ends 56 of the drag pivot 52. This drag bearing assembly is completed by the caps or covers 64, retaining nuts 65; and spacing rings 66, which latter are ground down to the right thickness to position the inner roller races 61 and 61' accurately. While this makes a good anti-friction arrangement, it may desirably have slightly more friction than the bearings at the flapping articulation. The range of angular motion permitted, however, is substantially less, being only about 3°, and this is determined by the clearance between the forward and rearward stops 54c, 54d (formed by the vertical slot in the outer end of drag link 54) with relation to the vertical web 58a of member 58 (as seen in Figure 5).

The outer end of the member 58 is in the form of a boss 58c, bored at an oblique angle (about 60°) with respect to the drag pivot axis, to receive a bearing bushing 67 in which is rotatably mounted the inclined or pitch-varying pin or axle 53, which latter is flanged adjacent its outer end, as at 68, for attachment by bolts or other suitable means to the wing root flange 69. The axle or pivot 53 is retained against centrifugal force by a split collar 70, which is locked by its integral keys 71, with the pivot member 53, and is clamped thereon by a nut 72, retained in any suitable way, as by a set screw 73 and snap ring 74 to secure the set screw in place. To complete this bearing arrangement, the flange 70a of the split collar abuts against a flange 67a of the bearing bushing. The pivot member 53 carries an external flange 53a which is notched or cut away at 53b (see Figure 4) to accommodate, with some clearance, the heads of a pair of studs 75, 76, which are mounted in the outer end of the box 58c, to form forward and rearward stops for the blade incidence adjustment which takes place by the rotation of the pivot or axle member 53. Suitable set screws 77 may be provided to lock these limiting stops in place. The clearance between the surfaces 53b and the two stop devices should provide a total angular rotation of about 16° for the pivot 53 in its bearing 67. Because of the use of a plain bearing bushing at this articulation, it is endowed with a greater friction than the articulation about the drag pivot.

In the modification shown in Figure 6, the drag link 54e is conically bored at 78 to receive a bushing 79 in which is mounted a member 80, common to both the drag and inclined articulations. This member 80 is vertically bored at 81, to receive a bushing 82 in which is mounted the drag pivot pin 83; and the blade root or socket member 50a is forked at 84, 85, to embrace the drag link and the block or pivot member 80, the jaws of the fork being apertured to receive the drag pivot pin 83. It will be observed that the axis y—y of the conical bearing which receives the member 80 is inclined upwards and outwards at an angle of about 50° to the drag pivot axis z—z, and lies in the same vertical plane as the latter and intersects it on the center line of the blade spar. The vertical angle of the conical bearing is approximately 9° and the vertex is upwards, with the result that the bearing pressure and hence the friction of the conical bearing is increased by and in accordance with the centrifugal force developed by the blade, and thus varies with variations in rotational speed; whereas the drag articulation has relatively little friction, under all conditions of operation. Stop devices for motions about these pivots are not illustrated in this figure, although it will be understood that ranges of clearance similar to those employed in the construction of Figure 2 may be used.

By reference to Figure 7, it will be observed that an arrangement generally similar to that shown in Figure 2 may be adapted to embody adjustable resistance mechanism, for regulating the resistance to blade pivotation or oscillation and for varying the differential resistance between any two of the articulating devices, particularly the drag articulation and the pitch changing articulation.

For this purpose, the jaw 59 of the second or outboard link 58, may be provided with a flange 86 to which is secured the casing or housing 87 of a shock absorber or damper, as by rivets 88. The drag pivot 52' may be extended upwardly, at 52a, centrally through the casing 87. The extension 52a of pin 52' is slotted at 89 to receive the tongues of pressure plates 90, 91, and intermediate plates 92. Another set of blades 93 have tongues which fit in slots 94 formed in the shell 87. Friction plates 95 suitably of some asbestos composition, are placed between the operating plates. The pressure can be adjusted to the desired degree by means of an adjusting nut 96 which may be retained in place by a lock nut 97. A rubber washer 98 serves to maintain constant pressure on the disks, to take care of slight wear, and to make accommodation for discrepancies or irregularities in the surface of the plates at different positions.

The damping device associated with the inclined pivot is similar to that just described, and will, therefore, be readily understood from the drawings. Its reaction is between the flange 58a which is integral with the structure 58, 58c (on the one hand), and the internal tubular pivot member 53 (on the other hand). In this form, the stop device for limiting the pivotation of the wing on the inclined pivot, may take the form of a pin 99 extending through the pivot member 53 and working in an elongated slot 100 formed in the wall of the boss 58c. One of the reasons for shifting the location of the stop device is to leave a convenient and advantageous location for mounting the damper or friction adjusting device, which, when so located (at the outboard end of the pivot member) is unaffected, in its adjustment, by the variations in centrifugal force, which are taken at the inboard end by the thrust bearing, which is similar to that described with reference to Figure 2.

I claim:

1. In an aircraft sustaining rotor, an upright rotatable hub, an elongated blade or wing extending approximately radially therefrom, and mechanism mounting the blade on the hub comprising a substantially horizontal pivot, a substantially vertical pivot, and a pivot inclined at an oblique angle to the longitudinal axis of the blade.

2. In an aircraft sustaining rotor, a rotatable hub, an elongated blade or wing, and mechanism mounting the blade on the hub comprising a flapping articulation, a drag articulation, and a pitch changing articulation, the pivot axes of said three articulations being disposed at angles to the longitudinal axis of the blade whereby the centrifugal force acting upon the blade during rotation of the rotor positively affects the pivotation of the blade on all three articulations.

3. In an aircraft sustaining rotor, a normally freely-rotative hub, an elongated blade or wing positioned normally at autorotative incidence, mechanism mounting the blade on the hub including a pivot axis so disposed as to accommodate blade oscillations chiefly transverse the direction of rotation, a pivot axis so disposed as to accommodate blade oscillations chiefly fore-and-aft within the general rotative path and a pivot axis so disposed as to accommodate blade oscillations in the sense of pitch variation, and means setting up greater resistance to blade pivotation about the second pivot axis than about the first and still greater resistance to pivotation about the third of the three pivot axes.

4. In an aircraft sustaining rotor, a rotatable hub, an elongated blade or wing, and mechanism mounting the blade on the hub including a plurality of pivots with their bearings, one pivot providing a blade flapping axis and another an axis angled thereto and to the blade axis, the articulative bearing itself at the latter of said pivots having a substantially greater frictional resistance to movement of the blade than exists at the first mentioned of the said pivots.

5. In an aircraft sustaining rotor, a rotatable hub, an elongated blade or wing, and mechanism mounting the blade on the hub including a plurality of pivots, one of said pivots providing for bodily swinging of the blade to accommodate variable flight loads, and another of said pivots being obliquely angled with respect to the longitudinal axis of the blade to provide for variation of the pitch of the blade, and means limiting the angular movement of the blade about the first mentioned pivot to a range smaller than the angular movement of the blade about the second mentioned pivot.

6. In an aircraft sustaining rotor, a rotatable hub, an elongated blade or wing, and mechanism mounting the blade on the hub including a plurality of pivots, one of said pivots providing for bodily swinging of the blade to accommodate variable flight loads, and another of said pivots being obliquely angled with respect to the longitudinal axis of the blade to provide for variation of the pitch of the blade, means setting up a substantially greater resistance to pivotation of the blade on the latter pivot than on the former, and means limiting the angular movement of the blade about the first mentioned pivot to a range smaller than the angular movement of the blade about the second mentioned pivot.

7. In an aircraft sustaining rotor, a rotatable hub, an elongated blade or wing, and mechanism mounting the blade on the hub including a plurality of pivots, one of said pivots providing for bodily swinging of the blade to accommodate variable flight loads, and another of said pivots providing for variation of the pitch of the blade, said pivots being positioned with their axes intersecting each other and the longitudinal blade axis.

8. In an aircraft sustaining rotor, a rotatable hub, an elongated blade or wing, and mechanism mounting the blade on the hub including a plurality of pivots, one of said pivots providing for bodily swinging of the blade to accommodate variable flight loads; and another of said pivots providing for variation of the pitch of the blade, said pivots being obliquely angled one to the other, on bodily intersecting centers.

9. In an aircraft sustaining rotor, a rotatable hub, an elongated blade or wing, and pivot mechanism for mounting the blade on the hub comprising two pivot members, one of which is mounted to turn on one axis and is bored at an angle oblique to said axis to rotatably receive the other pivot member.

10. In an aircraft sustaining rotor, a rotatable hub, a blade or wing, and pivot mechanism for mounting the blade on the hub including a tapered pivot or bearing positioned with its greater diameter nearer the center of rotation so as to tighten automatically with increase of centrifugal force of rotation of the rotor.

11. In an aircraft sustaining rotor, a rotatable hub, a blade or wing, and pivot mechanism for mounting the blade on the hub including a series of three pivots intermediate the blade root and the hub axis and each angled to the longitudinal blade axis, the centers of the three being spaced different distances from the hub axis.

12. In an aircraft sustaining rotor, a rotatable hub, a blade or wing, and pivot mechanism for mounting the blade on the hub including a series of three pivots intermediate the blade root and the hub axis, the centers of the three being spaced different distances from the hub axis and their axes being angled with respect to one another and to the longitudinal axis of the blade.

13. In an aircraft sustaining rotor, a rotatable hub, a blade or wing, and pivot mechanism for mounting the blade on the hub including a series of three pivots intermediate the blade root and the hub axis, the three pivot devices being spaced different distances from the hub axis, and all of the pivot axes as well as said hub axis being at angles to the longitudinal blade axis.

14. In an aircraft sustaining rotor, a rotatable hub, a blade or wing, and pivot mechanism for mounting the blade on the hub including a series of three pivots intermediate the blade root and the hub axis, the axes of the three being spaced different distances from the hub axis, all of which have their axes at angles to the longitudinal blade axis and to one another.

15. In an aircraft of the character described, a propeller, a normally autorotative sustaining rotor having a plurality of blades, means for shifting the general plane of rotation of the blades so as to shift the lift line of the rotor with respect to the center of gravity of the craft whereby adequate control is obtained even during substantially vertical flight operations, means for imparting a driving torque to the rotor, a brake for the rotor, means responsive to the application of driving torque for reducing the pitch of the blades and responsive to cessation of the driving torque or application of a braking torque to increase said pitch, whereby substantially vertical flight operations are obtained, and a controllable rudder substantially in line with the propeller axis and center of gravity of the craft whereby under the influence of the propeller slipstream the reactive torque in the body of the craft resulting by application of the rotor drive or brake for vertical flight operations may be counteracted without setting up appreciable rolling moments from said rudder.

16. A sustaining rotor having a hub, a plurality of blades, and for mounting each blade upon the hub a flapping pivot, a drag pivot, and a pitch varying pivot obliquely inclined to the longitudinal axis of the blade, and stop means for limiting the range of blade movement on all three pivots, said stop means providing the greatest range for the flapping motion and the least range for the motion on the drag pivot.

17. A sustaining rotor having a hub, a plurality of blades, and for mounting each blade upon the hub a flapping pivot, a drag pivot, and a pitch varying pivot, obliquely inclined to the longitudinal axis of the blade the flapping pivot being closest to the axis of the rotor and having the least resistance to pivotation, the drag pivot being farther removed from the rotor axis and having a greater resistance to pivotation, and the pitch varying pivot being still further removed from the rotor axis and having the greatest resistance to pivotation.

18. A sustaining rotor having a hub, a plurality of blades, and for mounting each blade upon the hub a flapping pivot, a drag pivot, and a pitch varying pivot obliquely inclined to the longitudinal axis of the blade, the flapping pivot being closest to the axis of the rotor and having the least resistance to pivotation, the drag pivot being farther removed from the rotor axis and having a greater resistance to pivotation, and the pitch varying pivot being still further removed from the rotor axis and having the greatest resistance to pivotation, and means for varying the resistance to pivotation about at least one of said pivots.

19. A sustaining rotor having a hub, a plurality of blades, and for mounting each blade upon the hub a flapping pivot, a drag pivot, and a pitch varying pivot obliquely inclined to the longitudinal axis of the blade, the flapping pivot being closest to the axis of the rotor and having the least resistance to pivotation, the drag pivot being farther removed from the rotor axis and having a greater resistance to pivotation, and the pitch varying pivot being still further removed from the rotor axis and having the greatest resistance to pivotation, and means for varying the relative resistance to blade pivotation about the drag pivot and pitch varying pivot.

20. In an aircraft sustaining rotor of the kind referred to, a hub member having a generally upright rotational axis, and mechanism for the attachment of the roots of the rotor blades to the hub member by means including a "flapping" pivot whose axis lies substantially in a plane perpendicular to the rotational axis, a "drag" pivot permitting the blade to swing relatively to the hub in the general plane of rotation, the axes of both said pivots being substantially perpendicular to the longitudinal blade axis, and a third pivot whose axis is inclined with respect to the longitudinal blade axis.

21. An aircraft sustaining rotor according to claim 20 wherein the third pivot axis of the blade root attachment is inclined outwardly and upwardly with respect to the drag pivot axis.

22. An aircraft sustaining rotor according to claim 20 wherein the triply articulated blade root attachment includes a construction which effects inclined pivot movement of the blade about the inclined pivot when a torque, either driving or braking, is applied to the rotor and during recovery of normal flying position of the blade on cessation of such torque, but materially restricts the movement on said inclined pivot in normal flight.

23. An aircraft sustaining rotor according to claim 20 wherein the frictional resistance to movement about the inclined pivot is greater than that about the drag pivot at least when the rotational speed of the rotor exceeds a certain value, which is less than the normal rotational speed in flight.

24. An aircraft sustaining rotor according to claim 20 wherein there are stop means limiting the blade movement about the drag pivot to a total amplitude not substantially exceeding the amplitude of individual blade oscillation in the general plane of rotation in normal flight manœuvres.

25. An aircraft sustaining rotor according to claim 20, wherein there are stop means positioned to limit the blade movement about the inclined pivot and to transmit a torque reaction, either driving or braking, between the hub member and the blades.

26. An aircraft sustaining rotor according to claim 20, wherein the inclined pivot has a conical plain bearing with the vertex so directed that the centrifugal force of the blade when rotating increases the bearing pressure and consequently the friction of the bearing.

27. An aircraft sustaining rotor according to claim 20 having non-reactive dampers applied to both the drag and inclined blade pivots, the dampers of the drag pivots being adapted to impose less resistance than those of the inclined pivots.

28. An aircraft sustaining rotor according to claim 20, wherein the drag pivots are provided with ball or roller bearings and the inclined pivots with plain bearings.

29. An aircraft sustaining rotor according to claim 20 wherein the offsets from the rotor axis of the intersections with the longitudinal blade axis of the drag and inclined pivot axes are equal, the drag and inclined pivot means being arranged on intersecting centers.

30. An aircraft sustaining rotor according to claim 20, in which a drag link extends outwardly from the flapping pivot, and the drag and inclined pivots are combined, there being a loose bush rotatable on the drag link about the inclined pivot axis and on the blade root about the drag pivot axis.

31. In an autorotatable sustaining rotor, an upright hub adapted to be power driven prior to take-off, a blade, mechanism mounting the blade on the hub comprising a flapping pivot, a drag pivot and a pitch varying pivot making an acute angle with the longitudinal blade axis at the upper side of the blade and outer side of the pivot, stop means limiting the range of angular movement about the pitch pivot, and stop means limiting to a smaller range the angular movement about the drag pivot.

32. In an autorotatable sustaining rotor, an upright hub adapted to be power driven prior to take-off, a blade, mechanism mounting the blade on the hub comprising a flapping pivot, a drag pivot and a pitch varying pivot making an acute angle with the longitudinal blade axis at the upper side of the blade and outer side of the pivot, stop means limiting the range of angular movement about the pitch pivot, and stop means limiting to a smaller range the angular movement about the drag pivot, the stop means for the pitch and drag pivots being so located on the blade mounting mechanism that the blade is at substantially zero lift pitch when it is in its maximum lagging position against the rearward limiting stops.

33. In an autorotatable sustaining rotor, an upright hub adapted to be power driven prior to take-off, a blade, mechanism mounting the blade on the hub comprising a flapping pivot, a drag pivot and a pitch varying pivot making an acute angle with the longitudinal blade axis at the upper side of the blade and outer side of the pivot, stop means limiting the range of angular movement about the pitch pivot, and stop means limiting to a smaller range the angular movement about the drag pivot, the stop means for the pitch and drag pivots being so located on the blade mounting mechanism that the blade is at substantially zero lift pitch when it is in its maximum lagging position against the rearward limiting stops, and means setting up greater resistance to blade movement about the pitch pivot than about the drag pivot.

34. In an aircraft sustaining rotor, a rotatable hub, an elongated blade or wing, and mechanism mounting the blade on the hub including a plurality of pivot devices positioned to accommodate lag and lead motions of the blade, one of said pivcot devices providing for such motions of the blade to accommodate the normal variable flight forces, and another of said pivot devices being obliquely angled with respect to the longitudinal axis of the blade to provide for variation of the pitch thereof, the latter pivot device having a greater resistance to pivotation of the blade thereabout than exists at the former of said pivot devices.

35. In an aircraft sustaining rotor, a hub, an autorotatable blade, and pivot mechanism securing said blade to said hub including a pivot having its axis obliquely angled with respect to the longitudinal axis of the blade, with bearing means for said pivot subject to variable thrust under varying rotational speeds of the rotor owing to the obliquity of said pivot, and a resistance device arranged co-axial with said pivot and constructed to set up resistance to pivotal movement of the blade about said pivot axis independently of the load on said bearing means whereby the resistance of said device is unaffected by variations in thrust on said bearing means.

36. In an aircraft sustaining rotor, a hub, a blade and pivots connecting the blade with the hub, the pivots including two pivots having their axes intersecting a plane perpendicular to the rotational axis and differentially angled with respect to the longitudinal blade axis.

37. In an aircraft having a rotative hub and sustaining blades mounted thereon, a hinge mounting for the individual blades on said hub comprising a plurality of pivotal axes offset relative to the system's center and angularly disposed relative to the system's plane of rotation and to each other, one of said axes being more offset than the other, and stops limiting the pivotal movement of the outer of these axes about the inner axis.

JAMES ALLAN JAMIESON BENNETT.